United States Patent Office 2,718,510
Patented Sept. 20, 1955

---

2,718,510

UREA - FORMALDEHYDE CONDENSATION SYRUPS FOR PAINTS AND VARNISHES AND PROCESS OF MAKING THEM

Pierre Alfred Talet, Paris, France, assignor to Societe Nobel Francaise, Paris, France, a joint-stock company of France No Drawing. Application October 21, 1952, Serial No. 316,069

Claims priority, application France November 17, 1951

4 Claims. (Cl. 260—33.4)

It is known that the condensations of urea and of formaldehyde, carried out in the presence of an alcohol under conditions such that a certain quantity of the latter enters in combination with the molecule of the resultant product, provide solutions suitable for use in the paint and varnish industry.

The alcohol the most often used in these manufactures is butyl alcohol; but numerous other carrier bodies having one or several alcoholic functions have also been advocated.

The present invention relates to a method of improving syrups belonging to the above mentioned class of products. The paint and varnish industry requires grades of such syrups which vary according to the contemplated uses; it is therefore desirable to dispose of efficient means which enable the various well-defined grades required by the user to be obtained at will. Although numerous useful characteristics may be controlled by the method forming the object of the invention, the latter relates above all to the viscosity and the compatibility with hydrocarbons.

It is known, in particular, that high viscosities are often sought after in such products. However, generally, this quality is only obtained at the expense of the compatibility with hydrocarbons and with the majority of glycerophthalic resins.

The invention relates to the preparation of etherified urea-formaldehyde condensation syrups in which the viscosity is exactly determined by the very conditions of manufacture which form the object of the invention.

The process has been found particularly efficient when it is desired to obtain high viscosity products which may be readily diluted with hydrocarbons.

Another advantage of the method resides in the fact that it allows of obtaining standard quality products in spite of the disturbing influence caused by the variations in behavior in the different batches of raw materials participating in the manufacture.

The principle of the invention is based mainly on the observation made by applicant that small additions of maleic acid or anhydride and of pentaerythrite are sufficient to substantially modify the properties of the etherified urea-formaldehyde condensations. By small additions is meant such amounts of maleic acid and pentaerythrite which, together, are of the order of 1%, and not exceeding 1.5% of the etherified urea-formaldehyde condensation syrup.

These additions may be incorporated at any stage of manufacture, but their effectiveness shows itself in a more pronounced way if the addition is effected on a syrup in which the methylol groups have previously been more or less completely blocked by etherification with the selected alcohol or mixture of alcohols.

The molecular relations pentaerythrite-maleic acid may, without departing from the spirit of the invention, be taken between fairly wide limits: for example between 0.5 and 1.5.

A few examples will bring out more clearly the characteristics of the invention without however limiting it.

*Example 1.*—Use is made as a starting material of urea-formaldehyde condensation syrup etherified by butyl alcohol and containing an excess of the said alcohol used as a solvent. It presents the following characteristics:

Dry extract (after evaporation of the volatile products): 70%.

Viscosity with a steel ball of 1.98 mm.: 63 seconds, pH=5.0;

Power of dilution with toluene: 100 grs. of syrup stand 390 grs. of toluene without becoming turbid;

0.22 part of pentaerythrite are added to 100 parts of this syrup. It is refluxed for 15 minutes.

0.22 part of maleic acid are then added and it is again refluxed for 15 minutes. The product obtained is allowed to cool to 25° C. and then by adding butanol, it is transformed again into a 70% dry extract. The characteristics have become the following:

Viscosity: 73 seconds.

pH: 4.2.

Power of dilution with toluene: 100 gr. of syrup stand 2000 gr. of toluene.

*Example 2.*—To an initial butylic syrup identical to that of Example 1, is added, under the same conditions, 0.5 part of pentaerythrite and 0.5 part of maleic acid for 100 parts of syrup. The pH is then brought to 4.6 by means of a sufficient quantity of hexamethylenetetramine in dissolution in the butanol. Use is made of a saturated solution at 60°.

The syrup obtained has the following characteristics:

Viscosity: 365 seconds.

Power of dilution with toluene: 100 gr. of syrup stand 1240 gr. of toluene.

It is to be understood that the invention has been described merely in an explanatory and by no means limitative manner and that alterations in the details thereof may be made without departing from the spirit of the invention.

What I claim is:

1. In the method for the production of an urea-formaldehyde condensation syrup for paints and varnishes having a high viscosity and being compatible with hydrocarbon solvents, the improvement which comprises refluxing a butylated urea-formaldehyde condensation syrup containing an excess of butyl alcohol as a solvent therefor with pentaerythrite and a substance selected from the group consisting of maleic acid and maleic anhydride, the combined amount of said pentaerythrite and said maleic compound not exceeding 1.5% of the said butylated urea-formaldehyde condensation syrup.

2. In the method for the production of an urea-formaldehyde condensation syrup for paints and varnishes having a high viscosity and being compatible with hydrocarbon solvents, the improvement which comprises refluxing 100 parts of a butylated urea-formaldehyde condensation syrup containing an excess of butyl alcohol as a solvent therefor with 0.22–0.5 parts of pentaerythrite and 0.22–0.5 parts of a substance selected from the group consisting of maleic acid and maleic anhydride.

3. Condensation syrup for varnishes and paints having a high viscosity and being compatible with hydrocarbon solvents, said condensation syrup being obtained by the refluxing or a butylated urea-formaldehyde condensation syrup containing an excess of butyl alcohol as a solvent therefor with pentaerythrite and maleic acid, the combined amount of said pentaerythrite and said maleic acid not exceeding 1.5% of the said butylated urea-formaldehyde condensation syrup.

4. In the method for the production of an urea-formaldehyde condensation syrup for paints and varnishes having a high viscosity and being compatible with hydrocarbon solvents, the improvement which comprises refluxing 100 parts of a butylated urea-formaldehyde condensation syrup containing an excess of butyl alcohol as a solvent therefor with 0.5 parts of pentaerythrite for approximately fifteen minutes, adding 0.5 parts of maleic acid to the mixture, refluxing for approximately fifteen minutes, adding hexamethylene tetramine in a butyl alcohol solution until a pH of 4.6 is reached, cooling the mixture, and adding butyl alcohol to obtain a solution which upon evaporation of the volatile material yields 70% of dry material.

References Cited in the file of this patent

UNITED STATES PATENTS

| | | |
|---|---|---|
| 2,016,198 | Howald | Oct. 1, 1935 |
| 2,565,538 | Welch et al. | Aug. 28, 1951 |